United States Patent [19]
Rand et al.

[11] Patent Number: 5,044,452
[45] Date of Patent: Sep. 3, 1991

[54] TILTED DECK MAIL HANDLING MACHINE

[75] Inventors: Ralph K. Rand, Sandy Hook, Conn.; John J. O'Brien, San Francisco, Calif.

[73] Assignee: Pitney Bowes Inc., Stamford, Conn.

[21] Appl. No.: 481,679

[22] Filed: Feb. 20, 1990

Related U.S. Application Data

[63] Continuation of Ser. No. 291,093, Dec. 28, 1988, abandoned.

[51] Int. Cl.⁵ .......................... G01G 23/38; B41J 3/00
[52] U.S. Cl. .......................................... 177/2; 101/91; 101/232
[58] Field of Search ................. 209/539, 707, 900; 156/441.5; 177/25.15, 2; 101/91, 232

[56] References Cited

U.S. PATENT DOCUMENTS

| | | | |
|---|---|---|---|
| 1,737,670 | 12/1929 | Ogden et al. | 271/2 |
| 3,196,964 | 7/1965 | Allen | 177/25.15 |
| 3,215,271 | 11/1965 | Cecchini | 209/900 |
| 3,877,531 | 4/1975 | Storace et al. | 177/1 |
| 3,905,325 | 9/1975 | Labore et al. | 156/441.5 |
| 4,171,744 | 10/1979 | Hubbard | 209/900 |
| 4,248,415 | 2/1981 | Seib | 271/227 |
| 4,428,573 | 1/1984 | Denison, III et al. | 271/305 |
| 4,516,209 | 5/1985 | Scribner | 177/25.15 |
| 4,551,188 | 11/1985 | Schulze | 156/441.5 |
| 4,589,555 | 5/1986 | Hollingsworth | 290/900 |
| 4,753,432 | 6/1988 | Freeman | 271/35 |
| 4,773,962 | 9/1988 | Garrigue et al. | 156/441.5 |

FOREIGN PATENT DOCUMENTS 153162  8/1985  European Pat. Off. ......... 156/441.5

Primary Examiner—Clifford D. Crowder
Attorney, Agent, or Firm—Charles G. Parks, Jr.; David E. Pitchenik; Melvin J. Scolnick

[57] ABSTRACT

A mixed mail processing machine comprising a series of modules for performing mail processing functions on the mail pieces as they are transported, oriented horizontally, along a feed deck bordered by a reference surface for registering the mail piece edges, the feed deck being tilted by an angle of 4°-6° off of a horizontal plane for utilizing the assistance of gravity forces to maintain the mail pieces registered.

2 Claims, 3 Drawing Sheets

TILTED DECK MAIL HANDLING MACHINE

The invention relates to machines for processing or handling mail pieces, and in particular mixed mail.

BACKGROUND OF THE INVENTION

A machine constructed to handle mixed mail generates a number of very severe problems. By mixed mail is meant envelopes of varying sizes, shapes, and thicknesses, and unflapped (sealed) and flapped (unsealed) envelopes.

For the postage printing operation, the envelopes must be registered, by which is meant that the edge of the envelope, typically at the flapped side, must occupy a predetermined position so that the postage printer prints the postage at the proper location at the corner of the envelope. This is typically accomplished by positively pushing the envelope up against a registration surface as it is conveyed through the machine. When the envelope is conveyed horizontally or flat, along a machine deck, the registration surface is typically a vertical wall. When the envelopes are all of the same width, and are conveyed downstream with a short side leading, registration is easily accomplished by providing a second wall spaced by the envelope width from the registration wall. This solution cannot be implemented with envelopes of different widths. Another possible solution is to devise some form of tamper for tamping the opposite long edge of the envelope as it is fed through successive modules of the machine and thus push the registration edge up against the registration wall. But this solution has been far too expensive to implement as a reliable means for maintaining registration of envelopes whose width can vary. Moreover, when the envelopes are being transported through the machine at up to four per second, devising a tamper that can instantaneously adjust to the differently sized envelopes flying through has proved essentially impossible.

SUMMARY OF THE INVENTION

We have discovered that there is available a relatively simple expedient which surprisingly solves the problem. That expedient is to tilt the deck along which the envelopes are transported from the place when they first must be registered to and throughout the printing station for the envelope. More specifically, we have discovered that if a registration wall or surface is established through the machine adjacent the deck along which the envelopes are transmitted, and if the deck is tilted so it slopes toward the registration surface at an angle between 4° and 6° from a horizontal plane, then the envelopes due to gravitational forces remain in contact with the registration surface while being transported, and equally important, operation of the various modules along the transport path is not detrimentally affected by the sloped deck. A tall stack of mail is prevented from tipping over by the angle as it moves the center of gravity rearward. This range of 4°-6° is critical, with 5° being preferred. At smaller angles, the envelopes do not maintain their registration. At greater angles, the transport mechanisms become difficult to implement, the standard singulating, sealing, weighing and printing modules, typically present in such mail handling machines, no longer operate reliably. With the deck slope maintained within this 4°-6° range, the standard mailhandling modules can be used without any significant redesign or reconstruction, and there is no need to provide the traditional front guides which would constrain the handling of different width mail pieces.

The sealing and printing modules each utilize liquids. Moreover, the weighing station requires a pause while mail is weighed. These functions traditionally demand flat surfaces, which makes the choice of a tilted deck even more surprising in the context of the present invention.

In a preferred embodiment of the invention, the mailing machine comprises a plurality of modules or stations arranged in sequence one after the other and including, starting from the upstream end of the mail flow, a feeder station, a singulator station, a sealer station, and a weighing and printer station, all of the units including a mail piece deck provided with transport means for conveying mail pieces oriented horizontally in sequence through the stations, the stations each containing a generally vertical surface used to register a side edge of each mail piece. The register surfaces of all of the stations are aligned and form a straight line from the feeder upstream end to the printer downstream end of the machine, and with their respective decks also in line with one another. In accordance with this aspect of the invention, the decks are all uniformly tilted from a horizontal plane down toward the reference surface at an angle between about 4° and 6°. Further, an orthogonal relationship is preferably maintained between the decks and the reference surface. This means, therefore, that the reference surface is also tipped backwards by about 4°-6° with respect to a vertical plane. Moreover, those units of the machine that employ liquids are suitably adapted to this tilted environment. For example, a flap glue moistener used in the sealing station, is described in a copending, concurrently-filed application Ser. No. 291,097, now U.S. Pat. No. 4,873,941 uses a positive pressure pump to spray water on the flap glue to avoid the problems that would be encountered if the more traditional wet roller were employed. Similarly, the inker for the printer uses a positive pressure system to dispense the ink to an inking pad each time just before the pad contacts the printer imprint wheels, to avoid uneven pad wetting due to the tilted positioning.

DESCRIPTION OF THE FIGURES

The invention will now be described in greater detail in connection with a preferred embodiment, reference being had to the accompanying drawings wherein.

DESCRIPTION OF THE PREFERRED EMBODIMENT

Figure 1:
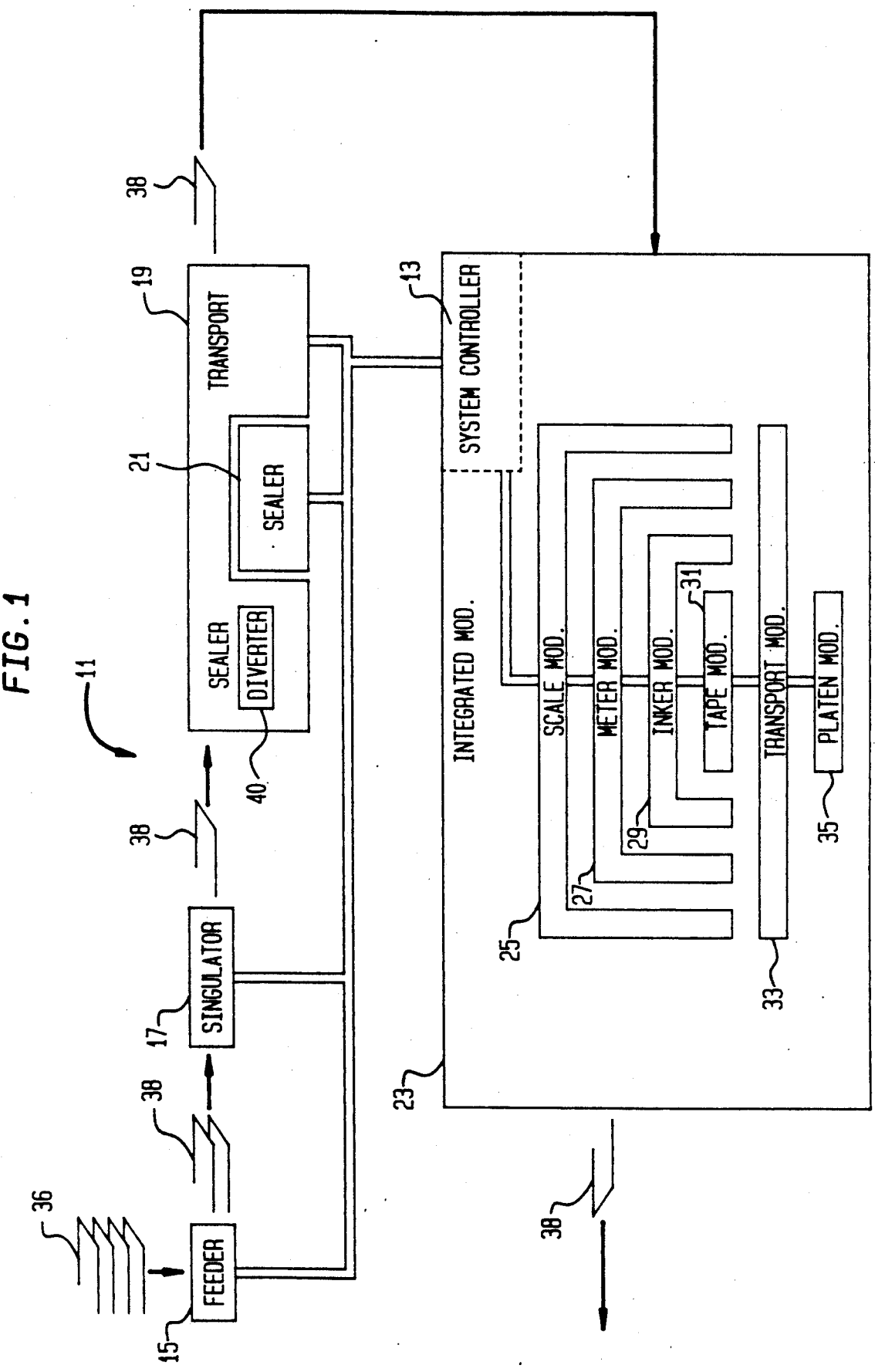
FIG. 1 is a general block diagram of a modular mail processing system.
Figure 3:
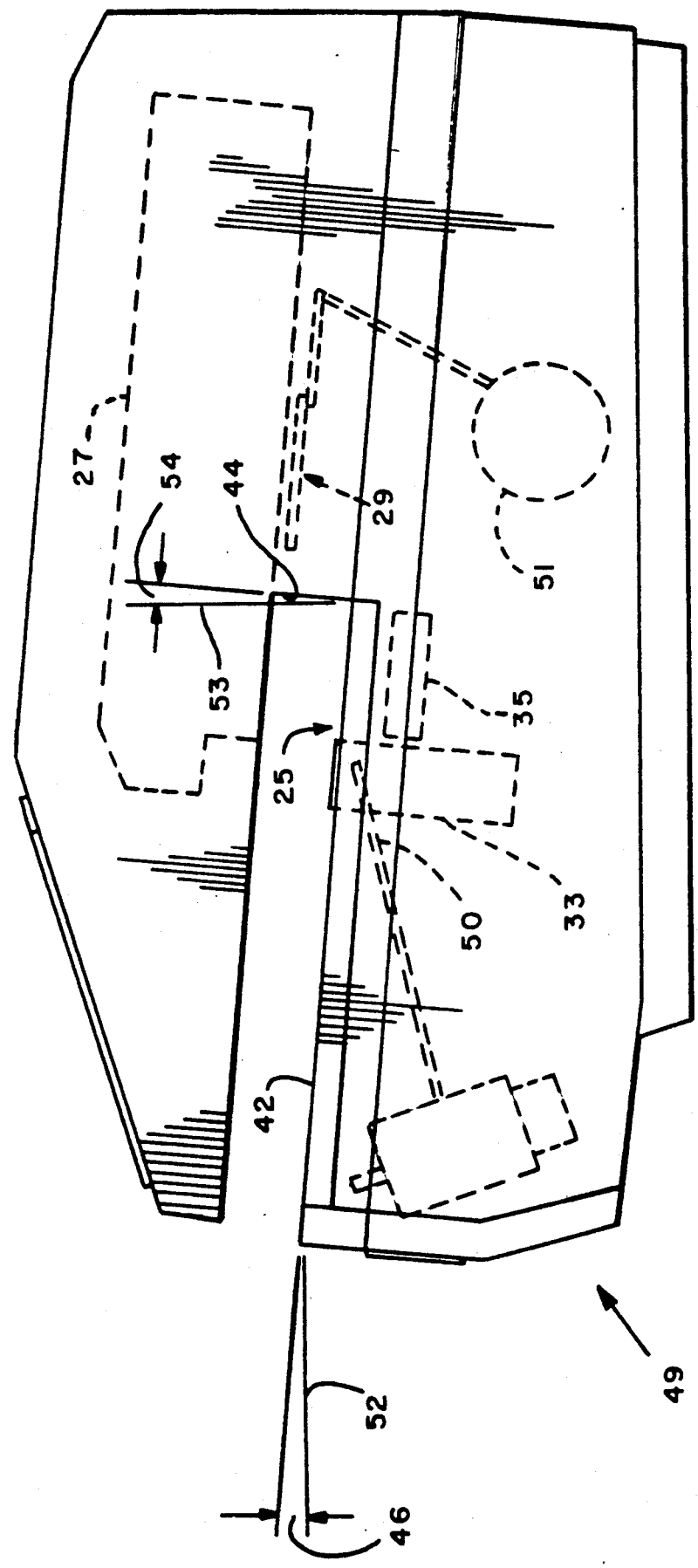
FIG. 3 is a schematic side view of the machine of FIG. 2.

Referring to FIGS. 1 and 3, a mail processing system, generally indicated as 11, is comprised of a plurality of modules under the control and influence of a system controller, generally indicated as 13. The individual modules are an envelope feeder module 15, a singulator module 17, a sealer transport module 19 which includes a sealer module 21, and what is here referred to as an integrated module 23. The integrated module is comprised of a scale module 25, a meter module 27, an inker module 29, an optional tape module 31, a transport module 33 and a platen module 35. The integrated module is so referred to because the individual modules are mounted in a single housing. Each module includes the appropriate mechanism to perform a mail processing function.

Although the term envelope will be employed hereinafter for convenience, it will be understood that the source document may include other forms of documents or mail pieces. Generally, the feeder module 15 receives an envelope stack 36 at a hopper end and, in the preferred embodiment, includes suitable mechanisms to shingle the bottom portion of the mail stack 36. The singulator 17 is charged with the function of extracting a bottommost envelope 38 from the now partially shingled envelope stack 36 in a seriatim manner and delivering the envelope 38 to the sealer transport module 19. The sealer transport module 19 is charged with the function of traversing the envelope 38 across the sealer module 21. The sealer transport module 19 has the capability of determining the sealing state of the envelope 38, by passing pre-sealed envelopes, and stripping open any unsealed flaps. The sealer transport module 19 also serves up the envelope 38 to the transport module 33 of the integrated module 23.

As aforenoted, the integrated module 23 is comprised of a scale module 25, a meter module 27, an inker module 29 including an inking liquid reservoir 30, a tape module 31, a transport module 33 and a platen module 35. The mailing machine transport module 33 receives the envelope 38 from the feeder transport 19 and delivers the envelope to the scale 25. The scale module 25 is charged with the function of weighing the envelope 38 and reporting the appropriate postage value as a function of the weight determined to the postage meter module 27 mounted to the mailing machine 23. The indicia printing method employed in the preferred mailing system is referred to in the art as flat bed indicia printing. In accordance therewith, as the envelope 38 rests upon the scale, subsequent to being weighed, the postage meter module 27 print elements are set to the appropriate value as a function of envelope 38 weight. The inker module 29, including an inking pad for inking the print wheels as well as an inking reservoir for applying ink to the inking pad 33, is then charged with the function of inking the indicia of the meter module 27. Subsequent to inking of the postage meter module print elements, the platen module 35 is charged with the function of bringing the envelope 38 into printing contact with the print elements of the postage meter module 27. After the envelope 38 has been imprinted by the postage meter module 27, the transport module 33 resumes control over the envelope 38 and ejects the envelope 38 from the mailing machine 23.

Each module includes a path along which the envelope is fed. The envelope is maintained under positive control at all times, meaning that it is continuously driven from module to module by means of a driving force. The horizontal deck or bed along which the envelope is driven through all modules is designated by 42. The registration surface, which exists through all the modules, in this case a rear surface of the machine, is designated 44. These two surfaces 42, 44 preferably meet in a manner such that they are orthogonal with respect to each other, but the bed or deck 42 reposes at an angle of between 4 and 6 degrees, preferably 5 degrees, with respect to a horizontal plane, and thus the registration surface 44 is off by a similar amount from a vertical plane.

Figure 2:
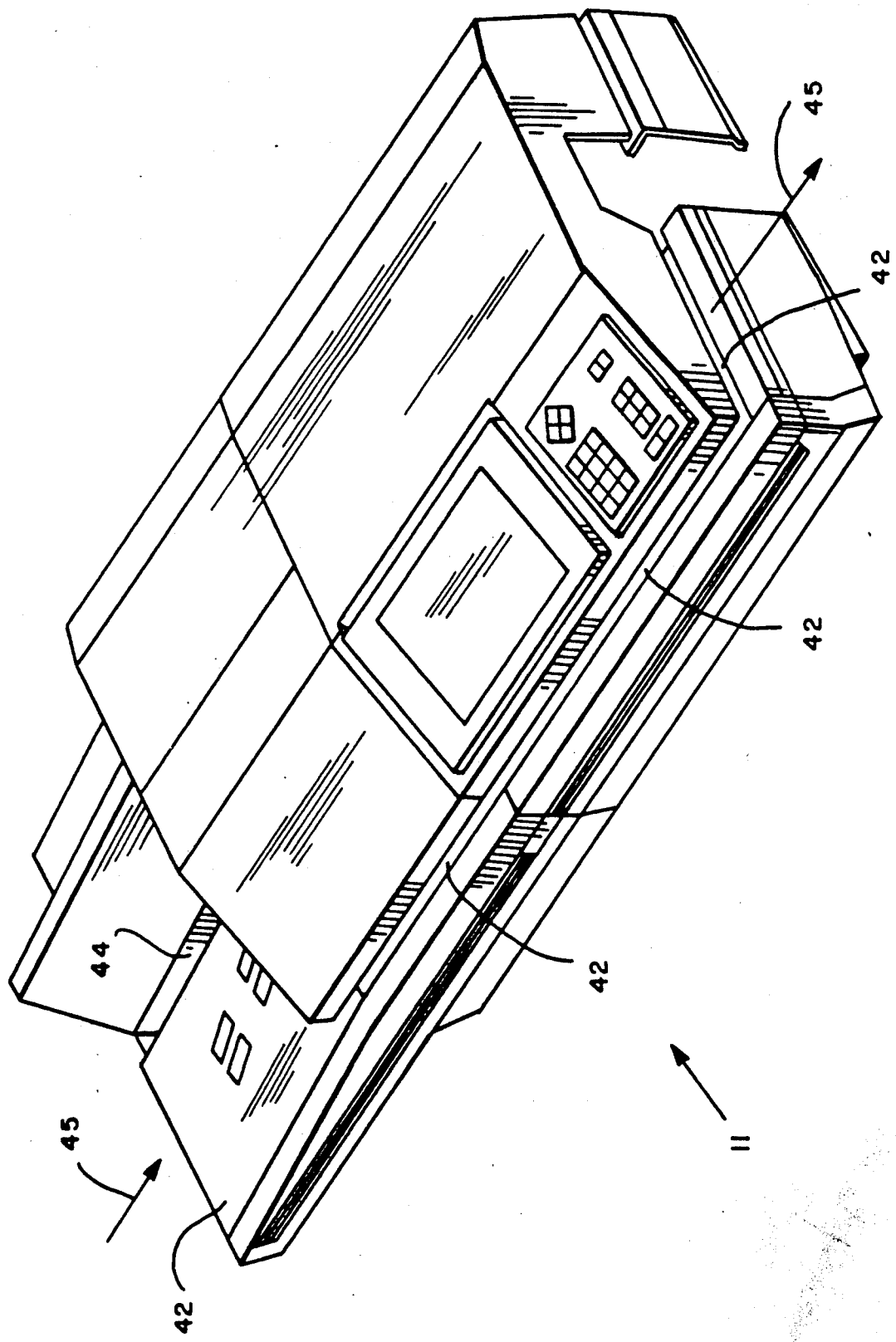
FIG. 2 is a perspective view of one form of mailing machine according to the invention illustrating the manner in which the feed deck is tilted.

FIG. 2 is a perspective view of the modular mailing machine, the feeder module not shown in detail is located at the left end of the machine, and the printer is located at the right end of the machine. Each of the units, the feeder, singulator, sealer, and weigher/printer include a horizontal deck, which are aligned and referenced 42, and a rear reference wall which are also aligned and referenced 44. The mail path is shown by the arrows labelled 45 and flows in a straight line from the upstream feeder end to the downstream printer end from which the stamped envelopes exit from the machine. During its entire flow, the envelope is supported by the generally horizontal deck surface 42 at each of the in-line modules, and all the deck surfaces are aligned. Moreover, all the reference surfaces 44 are aligned. What is unique about the machine is that all the reference surfaces 44, with respect to a vertical plane, and all the deck surfaces 42, with respect to a horizontal plane, are tilted by an angle designated 54, 46 (FIG. 3) of from 4°-6° backwards so that as the envelopes flow along the deck surfaces from module to module, the slight tilting maintains each envelope's long edge against the reference surface 44. Despite this tilting, all of the drive mechanisms can be conventional as they will operate properly in this environment. The sealer, which needs a moistener for the gummed surface, employs a closed system as described in copending, concurrently filed application, Ser. No. 291,037, now U.S. Pat. No. 4,924,805 wherein no gravity is used; instead, the water is pumped under pressure through a nozzle to form a spray for wetting the glue. In this pressurized system, the 4°-6° tilt has no effect. Similarly, the inker as described in copending, concurrently-filed application, Ser. No. 291,035, now abandoned, employs a positive pressure system in which the pad is provided with capillary channels which hold the ink in place, despite the tilting, and in which fresh ink is pumped into the pad channels preceding each inking operation. Thus, the gravity effect of the tilted pad does not detrimentally affect its operation, due to the almost continuous replenishment by the pump feed.

Thus, it will be evident that tilting the feed deck relative to the rear reference surface or together with the rear reference surface between four and six degrees maintains positive registration of the envelopes without loss of the advantages inherent to horizontal mail flow in a mail processing machine which requires the use of liquids to realize necessary functions.

FIG. 3 is a schematic side view of the machine with a number of components illustrated, most of which are not necessary for an understanding of the present invention, except that the nozzle indicated by 50 includes a liquid source and is part of the moistener and sealer 27, numeral 51 shows part of the inker 29 including an ink source for the meter indicia, and numeral 49 the integrated module which includes the scale module. The commonly aligned deck is shown at 42, and the commonly aligned reference wall at 44. A horizontal plane is indicated by reference 52, and a vertical plane by reference 53. Thus, the angle 46 between the deck 42 and the horizontal plane is 4°-6°, and the angle 54 between the wall 44 and the vertical plane designated 53 is the same 4°-6°, and thus the angle between the two surfaces 42 and 44 is 90° in this embodiment.

For completeness' sake, the feeder 15 is described in detail in copending application, Ser. No. 281,354, filed Dec. 8, 1988, now U.S. Pat. No. 4,897,587, the singulator in copending, concurrently-filed application, Ser.

No. 291,098, now U.S. Pat. No. 4,909,499, the sealer 21 in copending application, Ser. No. 292,059, filed Dec. 30, 1988, and the integrated module 23 in copending application, Ser. No. 134,625, filed Dec. 17, 1987, now abandoned, the contents of which applications are herein incorporated by reference.

While the invention has been described and illustrated in connection with preferred embodiments, many variations and modifications as will be evident to those skilled in this art may be made therein without departing from the spirit of the invention, and the invention as set forth in the appended claims is thus not be limited to the precise details of construction set forth above as such variations and modifications are intended to be included within the scope of the appended claims.

What is claimed is

1. In an article processing apparatus, the combination comprising:

feeder means for receiving a stack of varying size and thickness articles, said feeder means having a continuous feed deck, a reference wall extending longitudinally along one side of said deck, and having singulating means for withdrawing an article from the stack in a seriatim manner, sealing means for sealing said articles which are unsealed and feeder transport means for transporting said articles along said feed deck from said singulating means to and from said sealing means;

imprinting means for receiving said articles from said feeder transport means and printing on said articles, said imprinting means having a continuous imprinting deck, and having printing means including print members for imprinting on said article, said imprint means including an inker module having an ink pad for contact transfer of ink to said print members of said printing means, a supply ink reservoir and a pump means for causing ink to be delivered from said ink reservoir to said pad, and imprinting transport means for receiving articles from said feeder transport and positioning said article for imprinting by said imprinting means and causing said articles to be discharged from said imprinting means following imprinting; and said feeder deck and said imprinting decks being tiltable reclined with respect to the horizontal at a matching angle of approximately 4 to 6 degrees.

2. The apparatus of claim 1 wherein said imprinting means further comprises a scale means for weighing said articles and employing said imprinting deck as a weighing platform.

* * * * *